US00RE38315E

(19) United States
(12) Reissued Patent
Hodgson et al.

(10) Patent Number: US RE38,315 E
(45) Date of Reissued Patent: Nov. 18, 2003

(54) SCREW ELEMENT EXTRACTOR

(75) Inventors: Robert S. Hodgson, Evansville, IN (US); Michael J. Mattingly, Evansville, IN (US)

(73) Assignee: Apex Tool and Manufacturing, Inc., Evansville, IN (US)

(21) Appl. No.: 10/188,705

(22) Filed: Jul. 2, 2002

Related U.S. Patent Documents

Reissue of:
(64) Patent No.: 6,223,427
Issued: May 1, 2001
Appl. No.: 09/534,762
Filed: Mar. 24, 2000

U.S. Applications:

(63) Continuation of application No. 09/174,644, filed on Oct. 19, 1998, now Pat. No. 6,081,983.
(60) Provisional application No. 60/085,536, filed on May 15, 1998.

(51) Int. Cl.[7] ..... B23P 19/00; B23P 18/04
(52) U.S. Cl. ..... 29/822; 29/252; 29/426.3; 29/23.51
(58) Field of Search ..... 29/23.51, 426.3, 29/426.5, 889.1, 252, 822

(56) References Cited

U.S. PATENT DOCUMENTS 1,447,766 A * 3/1923 Vignier ..... 29/252
3,061,914 A * 11/1962 Johnston ..... 29/234
3,913,893 A * 10/1975 Scherping ..... 366/289
4,384,395 A * 5/1983 Gietman et al. ..... 29/234
4,754,539 A * 7/1988 Knoll et al. ..... 29/893.31
4,839,955 A * 6/1989 Vannier ..... 29/402.08
6,081,983 A * 7/2000 Hodgson et al. ..... 29/426.3

FOREIGN PATENT DOCUMENTS

| | | | |
|---|---|---|---|
| EP | 0 422 475 | * | 4/1991 |
| EP | 0 688 600 | * | 12/1995 |
| JP | 05-5293536 | * | 11/1993 |
| SU | 0 626 930 | * | 9/1978 |
| SU | 001 539 001 | * | 1/1990 |

* cited by examiner

*Primary Examiner*—Gregory Vidovich
*Assistant Examiner*—Eric B. Compton
(74) *Attorney, Agent, or Firm*—Barnes & Thornburg

(57) ABSTRACT

An apparatus for extracting screw elements from a screw shaft comprises a frame, a stationary clamp mounted on the frame and disposable between open and closed positions, a carriage mounted on the frame for motion toward and away from the stationary clamp, a movable clamp mounted on the carriage for motion therewith and disposable between open and closed positions, a first drive coupled to the stationary clamp for opening and closing the stationary clamp, a second drive coupled to the movable clamp for opening and closing the movable clamp, and a third drive coupled to the carriage for causing motion of the carriage toward and away from the stationary clamp, wherein clamping of a downstream screw element by the stationary clamp, clamping of an upstream screw element by the movable clamp and one or more strokes of the carriage away from the stationary clamp result in removal of the downstream screw element held in place by the stationary clamp from the screw shaft. The procedure is repeated until all the remaining screw elements are removed.

25 Claims, 5 Drawing Sheets

10
100
102
104
106
108
114
116
14
16
12
18
38
32
52
6
5

10
102
104
106
108
114
116
14
16
12
18
38
32
52

SCREW ELEMENT EXTRACTOR

Matter enclosed in heavy brackets [ ] appears in the original patent but forms no part of this reissue specification; matter printed in italics indicates the additions made by reissue.

This application is a continuation of U.S. patent application Ser. No. 09/174,644, filed on Oct. 19, 1998 now U.S. Pat. No. 6,081,983, and claims the benefit of U.S. provisional patent application Serial No. 60/085,536, filed May 15, 1998.

BACKGROUND AND SUMMARY OF THE INVENTION

The present invention generally relates to plastic forming processes (casting, molding, etc.) and, particularly, to extruders used in such processes. More particularly, the present invention relates to an apparatus for removing screw elements from an extruder screw shaft for cleaning, inspection, repairs or replacement.

Extruders are used extensively in the plastics industry. For example, extruders are typically employed in the plastics industry for producing plastic pellets from raw materials. These extruders comprise of two basic sections: the process section (extruder screw and barrel) and the forming section (head and die).

Raw material is loaded into a hopper which gravity feeds to an extruder screw rotatably mounted in a heated barrel. The screw is the heart of the extruder and consists of feed, transition and metering zones. The feed zone conveys the solid or sometimes half-molten or molten raw material out of the feed throat area to the transition zone, which starts compressing the preheated material. This zone forces the plastic against the heated barrel and continues the melting process, which is completed at the beginning of the metering zone. The metering zone conveys the molten plastic to the head and die section at uniform rates and under high pressure. The molten plastic passes through the die, where it is continuously formed into round strands or filaments (or other geometrical shapes). The round strands are then carried through a water cooling bath. When sufficiently cooled, the strands are fed to a chopper to be cut into pellets.

These pellets are produced in many different colors depending upon the application. Typically, injection molding process is used to transform these plastic pellets into molded products at high production rates and with good dimensional accuracy. For example, injection molding machines are used for molding television cabinets in assorted colors in the consumer electronics industry.

A conventional extruder screw comprises a rotatable shaft carrying a plurality of screw elements, which are configured to form a continuous helical spiral or thread on the outer surface thereof. Each of these screw elements have a central opening therein for receiving the shaft. The outer diameter of the shaft is slightly smaller than the inside diameter of the opening in the screw elements to provide a slip fit. The screw elements are slid over the shaft from one end ("the downstream end") and securely held in place against a collar or a flange either secured or integrally formed at the other end ("the upstream end"). The inner surfaces of the opening in the screw elements and the outer surfaces of the shaft are splined or serrated to ensure a good coupling between the screw elements and the shaft.

Normal extrusion operations at high temperatures and pressures force molten plastic between the screw elements and the shaft and into the splines meshing the screw elements to the shaft. Often the screw elements bond to the shaft due to close tolerances, high temperatures and use of highly filled plastics.

It is desirable to remove the screw elements from the screw shaft every time there is change in the pellet color to avoid cross contamination (which can be often depending on the batch size). The screw elements can then be thoroughly cleaned to remove the plastic from the previous batch and re-installed on the screw shaft. The need for frequent removal of the screw elements from the shaft is a problem that has plagued the extruder industry for a long time.

Screw elements may be heated to very high temperatures (for example, 900 degrees Fahrenheit) and forced out by using a sledge hammer and a brass bar (so-called "heat and beat" technique). This method of removing the screw elements from the shaft is undesirable due to the damage it can cause to the microstructure and the dimensional accuracy of the screw elements and the shaft. The hardened and wear resistant screw shaft and elements are particularly susceptible to cracking. Local overheating can cause deformation of the screw elements. The screw element extractor in accordance with the present invention allows removal of the screw elements from the screw shaft while reducing the risk of element damage, reducing the time for element removal and improving the safety of the personnel.

According to a first aspect of the present invention, an apparatus for extracting screw elements from a screw shaft comprises a frame, a stationary clamp mounted on the frame and disposable between open and closed positions, a carriage mounted on the frame for motion toward and away from the stationary clamp, a movable clamp mounted on the carriage for rectilinear motion therewith and disposable between open and closed positions, a first drive coupled to the stationary clamp for opening and closing the stationary clamp, a second drive coupled to the movable clamp for opening and closing the movable clamp, and a third drive coupled to the carriage for causing motion of the carriage toward and away from the stationary clamp, wherein clamping of a downstream screw element by the stationary clamp, clamping of an upstream screw element (or an upstream section of the screw shaft) by the movable clamp and one or more strokes of the carriage away from the stationary clamp result in removal of the downstream screw element from the screw shaft. The procedure can be repeated to remove all the remaining screw elements.

In accordance with another aspect of the present invention, a screw element extractor and a method of operating a screw element extractor comprise an apparatus for, and the steps of, mounting a stationary clamp on a frame, reciprocally mounting a carriage on the frame for motion toward and away from the stationary clamp, mounting a movable clamp on the carriage for motion therewith, opening the stationary clamp, opening the movable clamp, positioning the carriage adjacent the stationary clamp, supporting a screw shaft along an axis defined by the stationary and movable clamps such that its downstream end is disposed toward the stationary clamp and its upstream end is disposed toward the movable clamp, positioning a downstream screw element into the stationary clamp, closing the stationary clamp to hold the downstream screw element in place, closing the movable clamp to clamp an upstream screw element (or an upstream section of the screw shaft), moving the carriage away from the stationary clamp to extract the downstream screw element held in place by the stationary clamp, and opening the stationary clamp to release the downstream screw element.

Additional features and advantages of the invention will become apparent to those skilled in the art upon consideration of the following detailed description of the preferred embodiments exemplifying the best mode of carrying out the invention are presently perceived and the accompanying drawings which illustrate the invention.

DETAILED DESCRIPTION OF THE DRAWINGS

Figure 6:
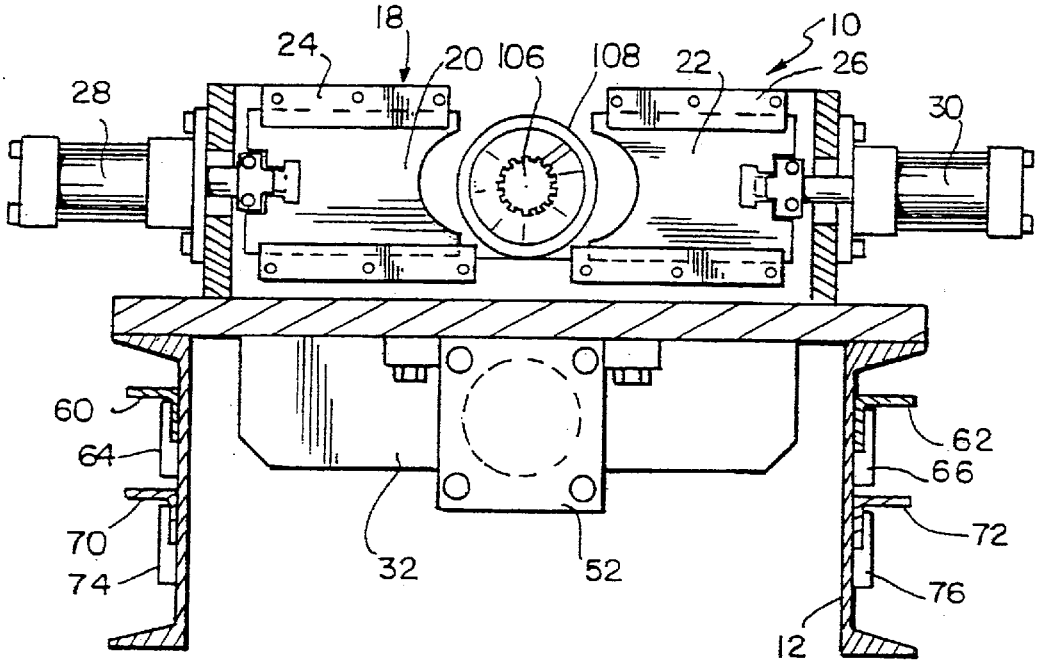
FIGS. 6 and 7 are fragmentary end views, taken along section lines 6—6 in FIG. 3, of the screw element extractor showing the stationary clamp mounted on the frame in open and closed positions respectively, and FIGS. 8(*a*) and (*d*) are schematic views of a screw shaft carrying one or more screw elements.
Figure 7:
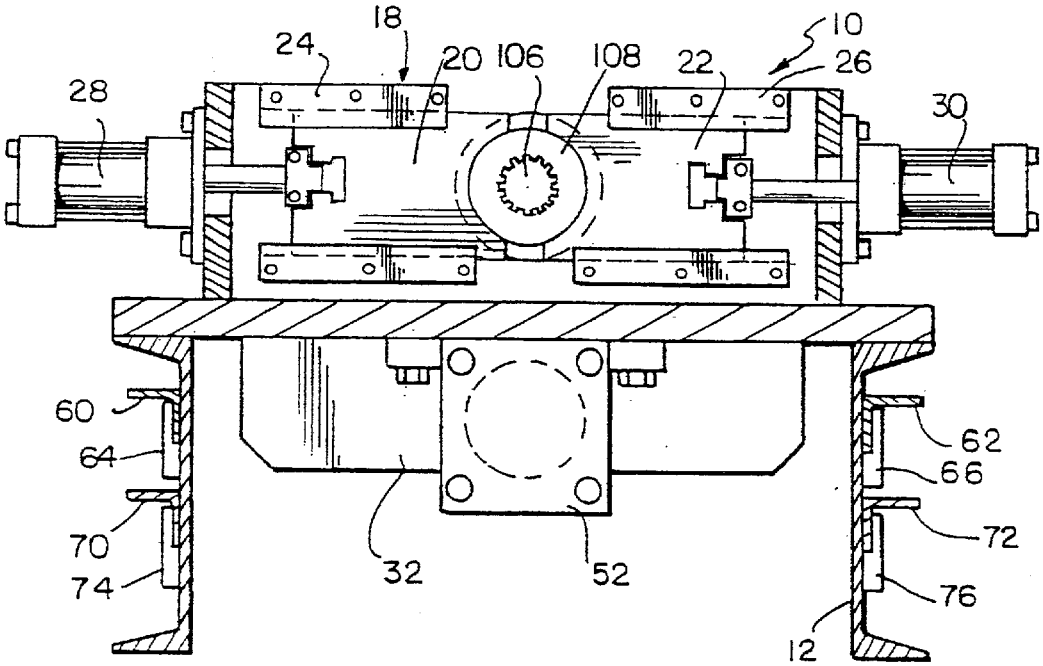
Figure 8A:
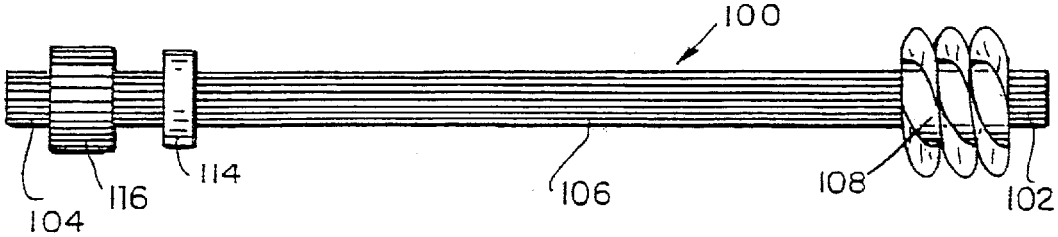
Figure 8B:
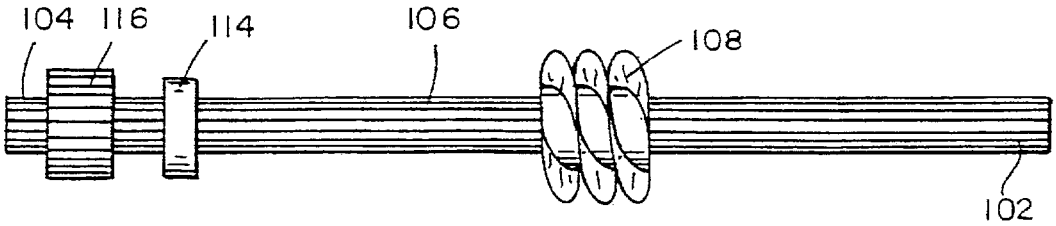
Figure 8C:
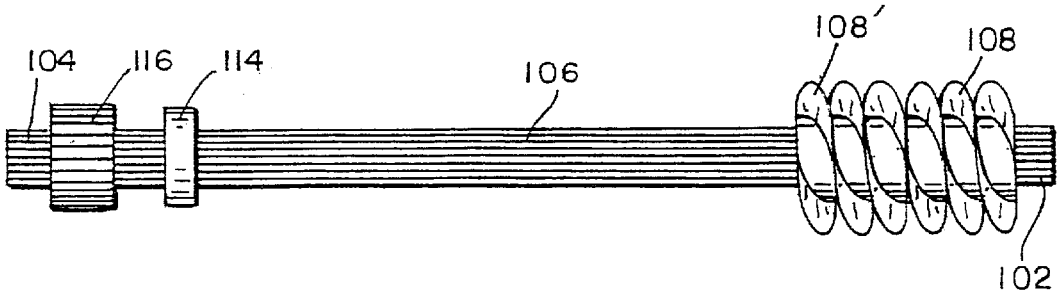
Figure 8D:
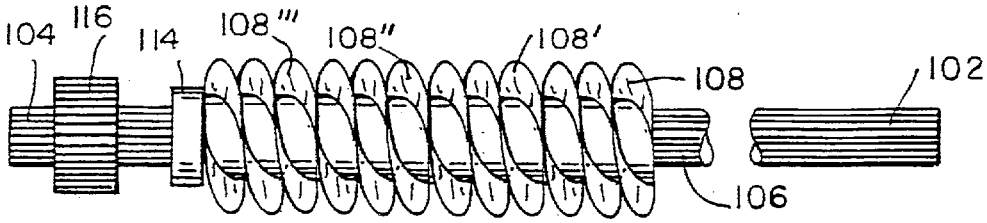

Referring now to the drawings, a screw element extractor 10 constructed according to the present invention includes a base frame 12 having downstream and upstream ends 14 and 16 respectively. A stationary clamp 18 is mounted on the frame 12 adjacent to the downstream end 14 thereof. As shown in FIGS. 6 and 7, the stationary clamp 18 comprises a first pair of jaws 20 and 22 slidably mounted on the frame 12 in the tracks 24 and 26, respectively, for motion toward and away from each other. The jaws 20 and 22 are coupled to and operated by a first pair of hydraulic cylinders or motors 28 and 30 between an open position shown in FIG. 6 and a closed position shown in FIG. 7. The jaws 20, 22 may be made from a suitable bronze compound (for example, AMPCO 18) or any other suitable material.

Figure 3:
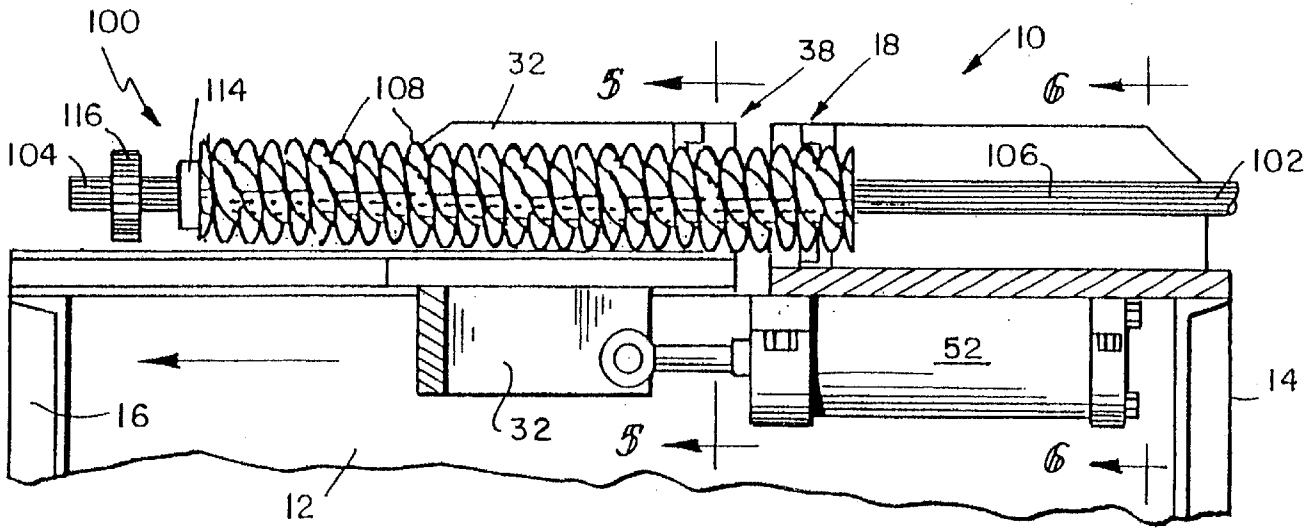
FIG. 3 is a fragmentary sectional side view, taken generally along section lines 3—3 in FIG. 1, of the screw element extractor showing a carriage positioned next to the stationary clamp, and further showing a hydraulic motor for actuating the carriage.
Figure 4:
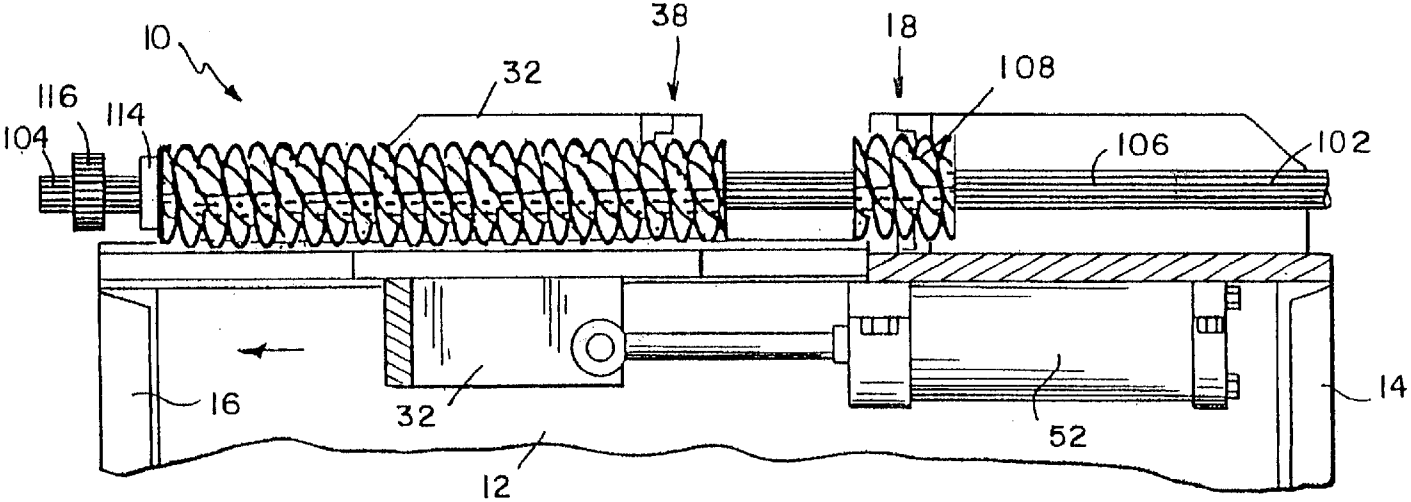
FIG. 4 is a view similar to FIG. 3, but showing the carriage positioned away from the stationary clamp.
Figure 5:
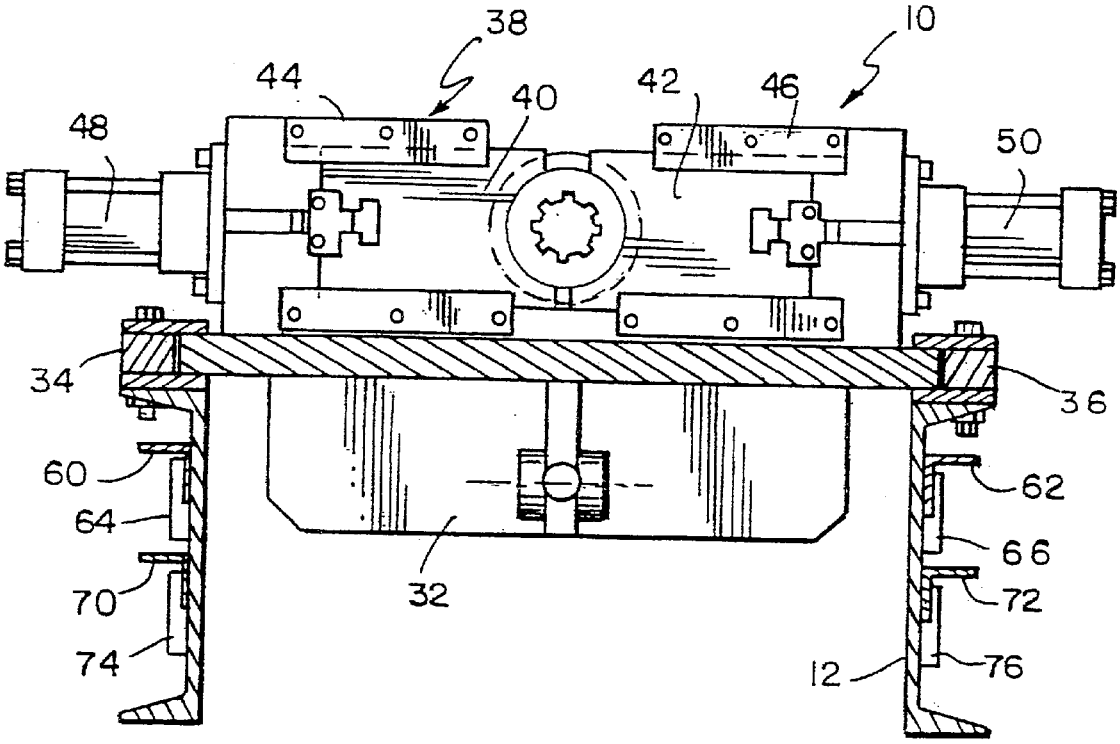
FIG. 5 is a fragmentary end view, taken along section lines 5—5 in FIG. 3, of the screw element extractor showing an upstream screw element clamped in the jaws of the movable clamp mounted on the carriage.

As shown in FIG. 5, a carriage 32 is reciprocally mounted in the tracks 34 and 36 in the frame 12 for generally horizontal motion toward and away from the stationary clamp 18. A movable clamp 38 is mounted on the carriage 32 for motion therewith. The movable clamp 38 comprises a second pair of jaws 40 and 42 slidably mounted on the carriage 32 in the tracks 44 and 46, respectively, for motion toward and away from each other. The jaws 40 and 42 are coupled to and operated by a second pair of hydraulic motors 48 and 50 between open and closed positions. A hydraulic motor 52 is mounted on the frame 12 and coupled to the carriage 32 for causing motion of the carriage toward and away from the stationary clamp 18 as shown in FIGS. 3 and 4. The jaws 40, 42 may also be made from a suitable bronze compound (for example, AMPCO 18) or any other suitable material.

Figure 1:
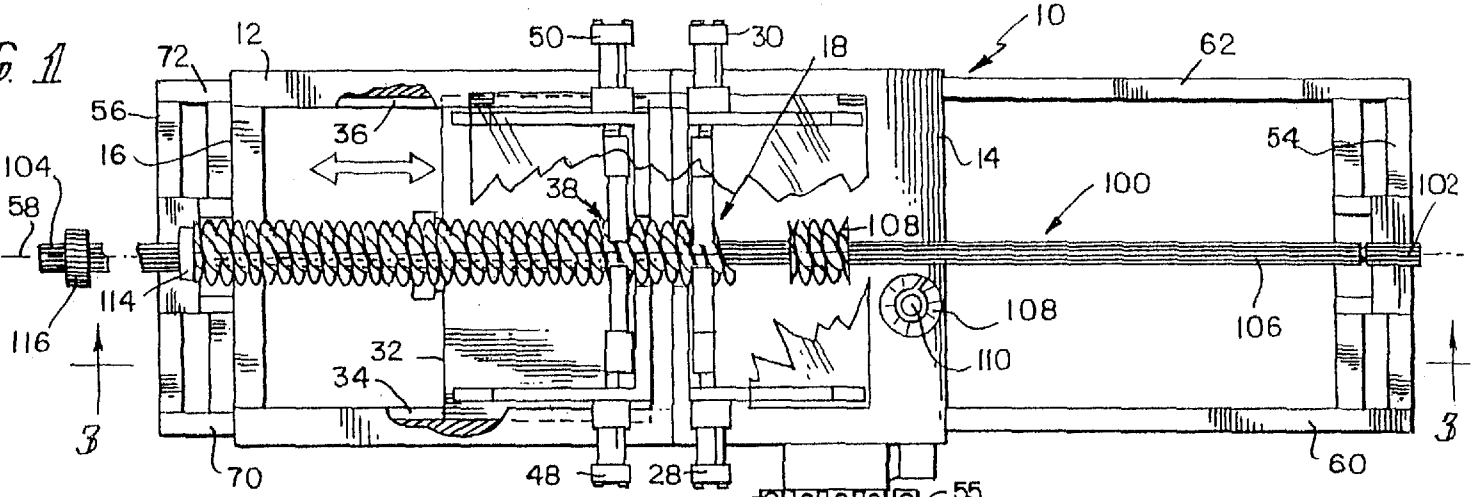
FIG. 1 is a plan view of a screw element extractor according to the present invention showing a stationary clamp mounted on a frame, a carriage reciprocally mounted on the frame for motion toward and away from the stationary clamp, a movable clamp mounted on the carriage for motion therewith, hydraulic motors for actuating the clamps and downstream and upstream outriggers arranged adjacent to the downstream and upstream ends of the frame for supporting the downstream and upstream ends of a screw shaft respectively.
Figure 2:
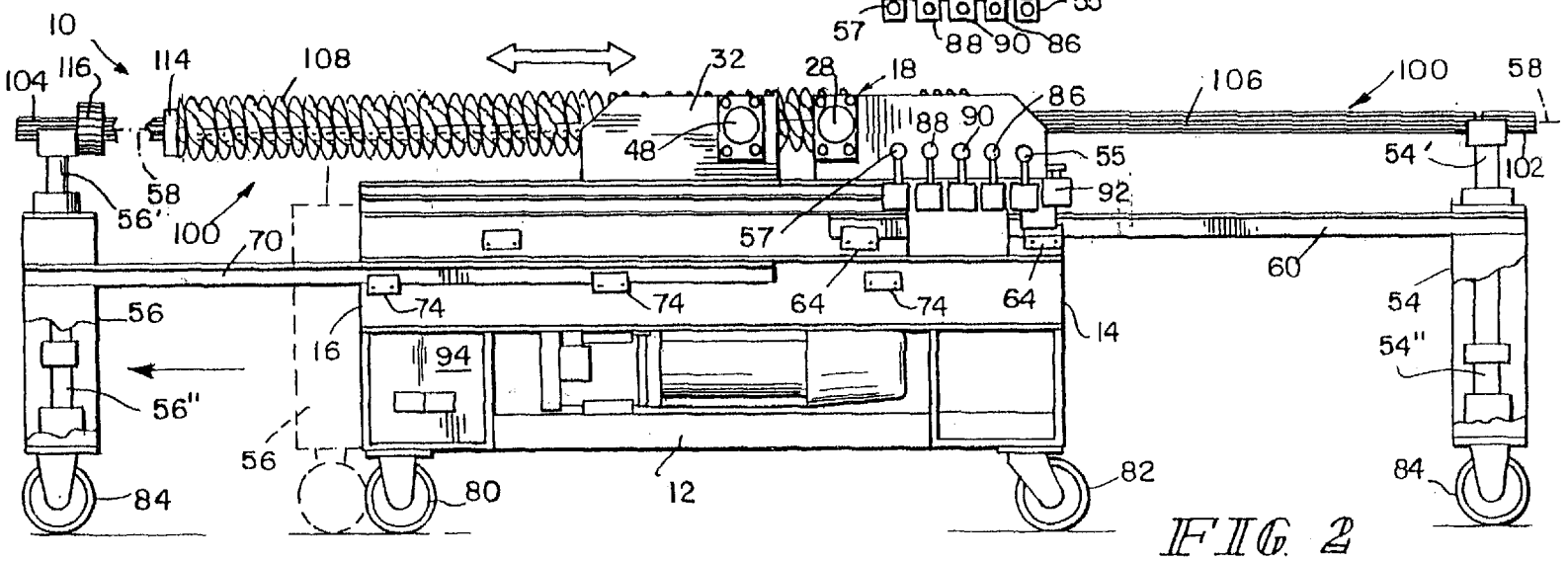
FIG. 2 is a side elevational view of the screw element extractor showing the carriage disposed adjacent to the stationary clamp, and further showing operator controls arranged on the right hand side of the machine for operating the stationary clamp, the movable clamp, the carriage and the outrigger cylinders.

As shown in FIG. 2, downstream and upstream outriggers 54 and 56 are respectively arranged adjacent to the downstream and upstream ends 14 and 16 of the frame 12. The stationary clamp 18 and movable clamp 38 are respectively mounted on the frame 12 and the carriage 32 at levels such that their center lines define a generally horizontal axis 58. The outriggers 54 and 56 are provided with support members 54' and 56' having V-shaped grooves for supporting downstream and upstream ends 102 and 104 of an extruder screw 100. Hydraulic cylinders 54" and 56" are provided to enable the operator to adjust the height of the screw shaft from the operator console using controls 55 and 57 respectively. The spacing between the outriggers 54, 56 can be adjusted to accommodate different length screw shafts 106. As shown in FIGS. 1, 2 and 5–7, the downstream outrigger 54 is provided with a pair of arms 60 and 62 which are guided in a generally horizontal plane by a first set of brackets 64 and 66 mounted on the respective sides of the frame 12. Similarly, the upstream outrigger 56 is provided with a pair of arms 70 and 72 which are also guided in a generally horizontal plane by a second set of brackets 74 and 76 mounted on the respective sides of the frame 12. The frame 12 is mounted on a set of stationary and swivel casters 80 and 82 to allow transportation of the extruder screw element extractor 10. The outriggers 54 and 56 are similarly provided with casters 84. The frame 12, the carriage 32 and the outriggers 54, 56 are made from mild steel.

A set of three (3) operator controls 86, 88 and 90 are mounted on the frame 12 and coupled to the first set of hydraulic motors 28, 30, the second set of hydraulic motors 48, 50 and the hydraulic motor 52 for respectively controlling the operation of the stationary clamp 18, the movable clamp 38 and the carriage 32. An emergency stop 92 is mounted next to the operator controls 86–90 to allow the operator to shut down all operations instantaneously should an emergency occur. An electrical control panel and a motor starter box, identified by the numeral 94, is conveniently located on the front side of the frame to increase the safety of operations and to protect the electrical system from spikes in the power line.

The extruder screw 100 comprises a rotatable shaft 106 carrying a plurality of screw elements 108, which are configured to form a continuous helical spiral or thread on the outer surface thereof. Each of these screw elements 108 have a central opening 110 therein for receiving the shaft 106. The outer diameter of the shaft 106 is slightly smaller than the inside diameter of the opening 110 in the screw elements to provide a slip fit. The inner surfaces of the opening 110 in the screw elements 108 and the outer surfaces of the shaft 106 are splined or serrated to ensure a good coupling between the screw elements and the shaft. The screw elements 108 are slid over the shaft from the downstream end 102 and securely held in place against a collar 114 formed at the upstream end 104. A drive pinion 116 is provided for driving the shaft 106 during the operation of the extruder.

The operation of the screw element extractor 10 of the present invention will be now described in conjunction with four (4) illustrative examples diagrammatically shown in FIGS. 8(*a*) to (*d*). Referring to FIG. 8(*a*), the method of removing a single screw element 108 from the screw shaft 106 comprises the steps of: opening the stationary clamp 18, opening the movable clamp 38, positioning the carriage 32 adjacent the stationary clamp, supporting the screw shaft 106 on the outriggers 54 and 56 along the generally horizontal axis 58 defined by the stationary and movable clamps such that its downstream end 102 is disposed toward the stationary clamp and its upstream end 104 is disposed toward the movable clamp, positioning the screw element 108 to be extracted into the stationary clamp, closing the stationary clamp to hold the screw element in place, closing the movable clamp to clamp the screw shaft 106, moving the carriage away from the stationary clamp to extract the shaft from the screw element held in place by the stationary clamp, opening the stationary clamp to release the screw element and opening the movable clamp to release the screw shaft.

Referring to FIG. 8(*b*), the method of removing a single screw element 108 from the screw shaft 106 comprises the steps of: opening the stationary clamp 18, opening the movable clamp 38, positioning the carriage 32 adjacent the stationary clamp, supporting the screw shaft 106 on the outriggers 54 and 56 along the generally horizontal axis 58 defined by the stationary and movable clamps such that its downstream end 102 is disposed toward the stationary clamp and its upstream end 104 is disposed toward the movable clamp, positioning the screw element 108 to be extracted into the stationary clamp, closing the stationary clamp to hold the screw element in place, closing the movable clamp to clamp the screw shaft 106, moving the carriage away from the stationary clamp to displace the screw element held in place by the stationary clamp toward the downstream end 102 of the screw shaft, performing the following steps one or more times until the screw shaft is completely extracted from the screw element: (opening the movable clamp, moving the carriage toward the stationary clamp, closing the movable clamp to clamp the screw shaft and moving the carriage away from the stationary clamp to further displace the screw element held in place by the stationary clamp toward the downstream end of the screw shaft), opening the stationary clamp to release the screw element and opening the movable clamp to release the screw shaft.

Referring to FIG. 8(*c*), the method of removing a pair of screw elements 108 and 108' from the screw shaft 106 comprises the steps of: opening the stationary clamp 18, opening the movable clamp 38, positioning the carriage 32 adjacent the stationary clamp, supporting the screw shaft 106 on the outriggers 54 and 56 along the generally horizontal axis 58 defined by the stationary and movable clamps such that its downstream end 102 is disposed toward the stationary clamp and its upstream end 104 is disposed toward the movable clamp, positioning the downstream screw element 108 to be extracted into the stationary clamp, closing the stationary clamp to hold the downstream screw element in place, closing the movable clamp to clamp the screw shaft 106, moving the carriage away from the stationary clamp to extract the shaft from the downstream screw element held in place by the stationary clamp, opening the stationary clamp to release the downstream screw element, moving the carriage toward the stationary clamp to return the screw shaft to its original position, closing the stationary clamp to hold the screw shaft in place, opening the movable clamp, moving the carriage away from the stationary clamp, closing the movable clamp to clamp the screw shaft, opening the stationary clamp, moving the carriage toward the stationary clamp to position the upstream screw element 108' into the stationary clamp, closing the stationary clamp to hold the upstream screw element in place, moving the carriage away from the stationary clamp to extract the screw shaft from the upstream screw element, opening the stationary clamp to release the upstream screw element and opening the movable clamp to release the screw shaft.

Referring to FIG. 8(*d*), the method of removing a plurality of elements 108, 108', 108" from a screw shaft 106 comprises the steps of: (a) opening the stationary clamp 18, (b) opening the movable clamp, (c) positioning the carriage 32 adjacent the stationary clamp, (d) supporting the screw shaft 106 on the outriggers 54 and 56 along the generally horizontal axis 58 defined by the stationary and movable clamps such that its downstream end 102 is disposed toward the stationary clamp and its upstream end 104 is disposed toward the movable clamp, (e) positioning the downstream screw element 108 to be extracted into the stationary clamp, (f) closing the stationary clamp to hold the downstream screw element 108 in place, (g) closing the movable clamp 38 to clamp an upstream screw element (for example, 108"), (h) moving the carriage away from the stationary clamp to displace the downstream screw element 108 held in place by the stationary clamp toward the downstream end of the shaft, (i) performing the following steps one or more times until the screw shaft is completely extracted the downstream screw element 108: (opening the movable clamp, moving the carriage toward the stationary clamp, closing the movable clamp to clamp an upstream screw element and moving the carriage away from the stationary clamp to further displace the downstream screw element 108 toward the downstream end of the clamp shaft), (j) opening the stationary clamp to release the downstream screw element 108, (k) opening the movable clamp to release the upstream screw element 108, (1) moving the carriage toward the stationary clamp, (m) positioning the second downstream screw element 108' to be extracted into the stationary clamp, (n) closing the stationary clamp to hold the second downstream screw element 108' in place, (o) closing the movable clamp to clamp an upstream screw element, (p) moving the carriage away from the stationary clamp to displace the second downstream screw element 108' held in place by the stationary clamp toward the downstream end of the shaft, (q) performing the following steps one or more times until the screw shaft is completely extracted the second downstream screw element 108': (opening the movable clamp, moving the carriage toward the stationary clamp, closing the movable clamp to clamp an upstream screw element and moving the carriage away from the stationary clamp to further displace the second downstream screw element 108' toward the downstream end of the screw shaft), (r) opening the stationary clamp to release the second downstream screw element 108', and (s) repeating the steps "k" to "r" to extract all the remaining elements from the screw shaft.

Illustratively, the hydraulic motors 28, 30, 48 and 50 for actuating the stationary clamp 18 and the movable clamp 38 are manufactured by Parker Hannifin Corporation, Model No. 2.50J2HU14AX3.00. The hydraulic motor 52 for driving the carriage is manufactured by Parker Hannifin Corporation, Model No. 5.00CP2HU24AX12.00. The hydraulic motors 54", 56" for driving the outrigger supports 54', 56' are manufactured by Parker Hannifin Corporation, Model No. 1.50J2HU18AX4.00. The hydraulic motor and pump used for supplying pressurized fluid to various hydraulic motors is manufactured by Fenner Stone, Model No. KMC17, KP16, KN12, KC08, KR46, KH, AA-1.

In the embodiments shown and described in FIGS. 1–7, a downstream screw element to be extracted is clamped by the stationary clamp 18, an upstream screw element is clamped by the movable clamp 38 and one or more strokes of the carriage 32 away from the stationary clamp extracts the shaft from the downstream screw element held in place by the stationary clamp. The procedure is repeated until all the remaining screw elements are removed.

Alternately, one may reverse the configuration by clamping a downstream screw element to be extracted by the movable clamp 38, clamping an upstream screw element by the stationary clamp 18 and displacing the carriage 32 one or more times to extract the downstream screw element held in place by the movable clamp from the screw shaft. The procedure can be repeated until all the remaining elements are removed.

Although the present invention has been described in detail with reference to certain preferred embodiments, variations and modifications exist within the scope and spirit of the present invention as described and as defined in the following claims.

What is claimed is:

1. An apparatus for extracting a plurality of screw elements from a screw shaft, the screw elements being slid over the screw shaft from a downstream end thereof and held in place against a collar provided at an upstream end thereof, the apparatus comprising:

a) a frame, b) a stationary clamp mounted on the frame and configured to clamp a downstream screw element, the stationary clamp being movable between an open position permitting reception of a downstream screw element and a closed position clamping the downstream screw element, c) a carriage mounted on the frame for motion toward and away from the stationary clamp, d) a movable clamp mounted on the carriage for motion therewith and configured to clamp an upstream screw element, the movable clamp being movable between an open position permitting reception of an upstream screw element and a closed position clamping the upstream screw element, e) a first drive coupled to the stationary clamp for opening and closing the stationary clamp, f) a second drive coupled to the movable clamp for opening and closing the movable clamp, and g) a third drive coupled to the carriage for causing motion of the carriage toward and away from the stationary clamp, wherein clamping of a downstream screw element by the stationary clamp, clamping of an upstream screw element by the movable clamp and one or more strokes of the carriage away from the stationary clamp result in removal of the downstream screw element from the screw shaft.

2. The apparatus of claim 1, wherein the stationary clamp comprises a first pair of jaws slidably mounted on the frame for motion toward and away from each other, and wherein the first drive comprises a first pair of hydraulic motors mounted on the frame and respectively coupled to the first pair of jaws.

3. The apparatus of claim 2, wherein the movable clamp comprises a second pair of jaws slidably mounted on the carriage for motion toward and away from each other, and wherein the second drive comprises a second pair of hydraulic motors mounted on the carriage and respectively coupled to the second pair of jaws.

4. The apparatus of claim 3, wherein the third drive comprises a third hydraulic motor mounted on the frame and coupled to the carriage.

5. The apparatus of claim 1, wherein the first, second and third drives comprise hydraulic motors.

6. The apparatus of claim 1 further including first, second and third operator controls coupled to the first, second and third drives for controlling the operation of the stationary clamp, the movable clamp and the carriage respectively.

7. The apparatus of claim 1, wherein the carriage is mounted on the frame for generally horizontal motion, wherein the stationary and movable clamps are respectively mounted on the frame and the carriage such that a screw shaft supported by the clamps is disposed along a generally horizontal axis.

8. The apparatus of claim 7 further including downstream and upstream outriggers separate from the frame and arranged adjacent to the downstream and upstream ends of the frame for supporting the downstream and upstream ends of the screw shaft extending beyond the downstream and upstream ends of the frame respectively along the generally horizontal axis.

9. The apparatus of claim 8, wherein the first and second outriggers are provided with first and second sets of guide arms, and wherein the frame is provided with generally horizontal, first and second sets of side rails for respectively receiving the first and second sets of guide arms of the first and second outriggers.

*10. An apparatus for extracting a plurality of screw elements from a screw shaft, the screw elements being slid over the screw shaft from a downstream end thereof and held in place against a stop provided at an upstream end thereof, the apparatus comprising:*

*a) a frame,*

*b) a stationary clamp mounted on the frame and configured to clamp a downstream screw element, the stationary clamp being movable between an open position permitting reception of a downstream screw element and a closed position clamping the downstream screw element,*

*c) a carriage mounted on the frame for motion toward and away from the stationary clamp,*

*d) a movable clamp mounted on the carriage for motion therewith and configured to clamp an upstream screw element, the movable clamp being movable between an open position permitting reception of an upstream screw element and a closed position clamping the upstream screw element, and*

*e) a drive coupled to the carriage for causing motion of the carriage toward and away from the stationary clamp, wherein clamping of a downstream screw element by the stationary clamp, clamping of an upstream screw element by the movable clamp and one or more strokes of the carriage away from the stationary clamp result in removal of the downstream screw element from the screw shaft.*

*11. An apparatus for extracting a plurality of screw elements from a screw shaft, the screw elements being slid over the screw shaft from a downstream end thereof and held in place against a stop provided at an upstream end thereof, the apparatus comprising:*

*a) a frame,*

*b) a stationary clamp mounted on the frame and configured to clamp a downstream screw element, the stationary clamp being movable between an open position permitting reception of a downstream screw element and a closed position clamping the downstream screw element,*

*c) a carriage mounted on the frame for motion toward and away from the stationary clamp, and*

*d) a movable clamp mounted on the carriage for motion therewith and configured to clamp an upstream screw element, the movable clamp being movable between an open position permitting reception of an upstream screw element and a closed position clamping the upstream screw element,*

*wherein clamping of a downstream screw element by the stationary clamp, clamping of an upstream screw element by the movable clamp and one or more strokes of the carriage away from the stationary clamp result in removal of the downstream screw element from the screw shaft.*

*12. An apparatus for extracting a plurality of screw elements from a screw shaft, the screw elements being slid over the screw shaft from a downstream end thereof and held in place against a stop provided at an upstream end thereof, the apparatus comprising:*

*a) a frame,*

*b) a stationary clamp mounted on the frame and configured to clamp an upstream screw element, the stationary clamp being movable between an open position permitting reception of an upstream screw element and a closed position clamping the upstream screw element,*

*c) a carriage mounted on the frame for motion toward and away from the stationary clamp,*

*d) a movable clamp mounted on the carriage for motion therewith and configured to clamp a downstream screw element, the movable clamp being movable between an open position permitting reception of a downstream screw element and a closed position clamping the downstream screw element,*

*e) a first drive coupled to the stationary clamp for opening and closing the stationary clamp,*

*f) a second drive coupled to the movable clamp for opening and closing the movable clamp, and*

*g) a third drive coupled to the carriage for causing motion of the carriage toward and away from the stationary clamp, wherein clamping of an upstream screw element by the stationary clamp, clamping of a downstream screw element by the movable clamp and one or more strokes of the carriage away from the stationary clamp result in removal of the downstream screw element from the screw shaft.*

*13. The apparatus of claim 12, wherein the stationary clamp comprises a first pair of jaws slidably mounted on the frame for motion toward and away from each other, and wherein the first drive comprises a first pair of hydraulic motors mounted on the frame and respectively coupled to the first pair of jaws.*

*14. The apparatus of claim 12, wherein the movable clamp comprises a second pair of jaws slidably mounted on the carriage for motion toward and away from each other, and wherein the second drive comprises a second pair of hydraulic motors mounted on the carriage and respectively coupled to the second pair of jaws.*

*15. The apparatus of claim 12, wherein the third drive comprises a third hydraulic motor mounted on the frame and coupled to the carriage.*

*16. The apparatus of claim 12, wherein the first, second and third drives comprise hydraulic motors.*

*17. The apparatus of claim 12 further including first, second and third operator controls coupled to the first, second and third drives for controlling the operation of the stationary clamp, the movable clamp and the carriage respectively.*

*18. The apparatus of claim 12, wherein the carriage is mounted on the frame for generally horizontal motion, wherein the stationary and movable clamps are respectively mounted on the frame and the carriage such that a screw shaft supported by the clamps is disposed along a generally horizontal axis.*

*19. The apparatus of claim 18 further including downstream and upstream outriggers separate from the frame and arranged adjacent to the downstream and upstream ends of the frame for supporting the downstream and upstream ends of the screw shaft extending beyond the downstream and upstream ends of the frame respectively along the generally horizontal axis.*

*20. The apparatus of claim 19, wherein the first and second outriggers are provided with first and second sets of guide arms, and wherein the frame is provided with generally horizontal, first and second sets of side rails for respectively receiving the first and second sets of guide arms of the first and second outriggers.*

*21. An apparatus for extracting a plurality of screw elements from a screw shaft, the screw elements being slid over the screw shaft from a downstream end thereof and held in place against a stop provided at an upstream end thereof, the apparatus comprising:*

*a) a frame,*

*b) a stationary clamp mounted on the frame and configured to clamp an upstream screw element, the stationary clamp being movable between an open position permitting reception of an upstream screw element and a closed position clamping the upstream screw element,*

*c) a carriage mounted on the frame for motion toward and away from the stationary clamp,*

*d) a movable clamp mounted on the carriage for motion therewith and configured to clamp a downstream screw element, the movable clamp being movable between an open position permitting reception of a downstream screw element and a closed position clamping the downstream screw element, and*

*e) a drive coupled to the carriage for causing motion of the carriage toward and away from the stationary clamp, wherein clamping of an upstream screw element by the stationary clamp, clamping of a downstream screw element by the movable clamp and one or more strokes of the carriage away from the stationary clamp result in removal of the downstream screw element from the screw shaft.*

*22. An apparatus for extracting a plurality of screw elements from a screw shaft, the screw elements being slid over the screw shaft from a downstream end thereof and held in place against a stop provided at an upstream end thereof, the apparatus comprising:*

*a) a frame,*

*b) a stationary clamp mounted on the frame and configured to clamp an upstream screw element, the stationary clamp being movable between an open position permitting reception of an upstream screw element and a closed position clamping the upstream screw element,*

*c) a carriage mounted on the frame for motion toward and away from the stationary clamp, and*

*d) a movable clamp mounted on the carriage for motion therewith and configured to clamp a downstream screw element, the movable clamp being movable between an open position permitting reception of a downstream screw element and a closed position clamping the downstream screw element, and*

*wherein clamping of an upstream screw element by the stationary clamp, clamping of a downstream screw*

*element by the movable clamp and one or more strokes of the carriage away from the stationary clamp result in removal of the downstream screw element from the screw shaft.*

*23. An apparatus for extracting a plurality of screw elements from a screw shaft comprising:*

*a) a frame,*

*b) a stationary clamp mounted on the frame and configured to clamp a first screw element, the stationary clamp being movable between an open position permitting reception of a first screw element and a closed position clamping the first screw element,*

*c) a carriage mounted on the frame for motion toward and away from the stationary clamp,*

*d) a movable clamp mounted on the carriage for motion therewith and configured to clamp a second screw element, the movable clamp being movable between an open position permitting reception of a second screw element and a closed position clamping the second screw element,*

*e) a first drive coupled to the stationary clamp for opening and closing the stationary clamp,*

*f) a second drive coupled to the movable clamp for opening and closing the movable clamp, and*

*g) a third drive coupled to the carriage for causing motion of the carriage toward and away from the stationary clamp, wherein clamping of a first screw element by the stationary clamp, clamping of a second screw element by the movable clamp and one or more strokes of the carriage away from the stationary clamp result in removal of one of the first and second screw elements from the screw shaft.*

*24. An apparatus for extracting a plurality of screw elements from a screw shaft comprising:*

*a) a frame,*

*b) a stationary clamp mounted on the frame and configured to clamp a first screw element, the stationary clamp being movable between an open position permitting reception of a first screw element and a closed position clamping the first screw element,*

*c) a carriage mounted on the frame for motion toward and away from the stationary clamp,*

*d) a movable clamp mounted on the carriage for motion therewith and configured to clamp a second screw element, the movable clamp being movable between an open position permitting reception of a second screw element and a closed position clamping the second screw element, and*

*e) a drive coupled to the carriage for causing motion of the carriage toward and away from the stationary clamp, wherein clamping of a first screw element by the stationary clamp, clamping of a second screw element by the movable clamp and one or more strokes of the carriage away from the stationary clamp result in removal of one of the first and second screw elements from the screw shaft.*

*25. An apparatus for extracting a plurality of screw elements from a screw shaft comprising:*

*a) a frame,*

*b) a stationary clamp mounted on the frame and configured to clamp a first screw element, the stationary clamp being movable between an open position permitting reception of a first screw element and a closed position clamping the first screw element,*

*c) a carriage mounted on the frame for motion toward and away from the stationary clamp, and*

*d) a movable clamp mounted on the carriage for motion therewith and configured to clamp a second screw element, the movable clamp being movable between an open position permitting reception of a second screw element and a closed position clamping the second screw element,*

*wherein clamping of a first screw element by the stationary clamp, clamping of a second screw element by the movable clamp and one or more strokes of the carriage away from the stationary clamp result in removal of one of the first and second screw elements from the screw shaft.*

* * * * *